United States Patent
Mitchell et al.

(10) Patent No.: US 11,477,276 B2
(45) Date of Patent: Oct. 18, 2022

(54) SYSTEMS AND METHODS FOR AUTOMATED, CONTROLLERLESS AND STATELESS NETWORK CONNECTION SELECTION BASED ON DISTRIBUTED SERVER INFORMATION

(71) Applicant: IP Technology Labs, LLC, Baltimore, MD (US)

(72) Inventors: Gary Mitchell, Owings Mills, MD (US); Scott Whittle, Olney, MD (US); Kurt Quasebarth, Baltimore, MD (US)

(73) Assignee: IP Technology Labs, LLC, Baltimore, MD (US)

( * ) Notice: Subject to any disclaimer, the term of this patent is extended or adjusted under 35 U.S.C. 154(b) by 0 days.

(21) Appl. No.: 17/183,953

(22) Filed: Feb. 24, 2021

(65) Prior Publication Data

US 2022/0272147 A1 Aug. 25, 2022

(51) Int. Cl.
*G06F 15/173* (2006.01)
*H04L 67/101* (2022.01)
*H04L 47/125* (2022.01)
*H04L 67/1008* (2022.01)

(52) U.S. Cl.
CPC .......... *H04L 67/101* (2013.01); *H04L 47/125* (2013.01); *H04L 67/1008* (2013.01)

(58) Field of Classification Search
CPC .......... H04L 29/08171; H04L 29/0818; H04L 67/101; H04L 67/1008; H04L 29/08153; H04L 29/08261; H04L 67/1004; H04L 67/1029; H04L 47/125; H04L 45/28; H04L 67/1034; H04L 67/01

USPC .......... 709/219, 224, 226
See application file for complete search history.

(56) References Cited

U.S. PATENT DOCUMENTS

| | | | |
|---|---|---|---|
| 6,078,960 A * | 6/2000 | Ballard | H04L 67/1008 709/203 |
| 6,175,869 B1 * | 1/2001 | Ahuja | H04L 67/1008 709/203 |
| 6,950,849 B1 * | 9/2005 | Brandstatter | G06F 9/505 709/203 |

(Continued)

*Primary Examiner* — Johnny B Aguiar
(74) *Attorney, Agent, or Firm* — Offit Kurman, P.A.; Steven Scott Lloyd

(57) ABSTRACT

The invention is that of systems and methods for controllerless and distributed network connections to servers on a network by remote clients seeking their services. The invention comprises a server database where servers within a server group identified by a groupname may post unique identifiers (UIDs) for retrieval by group clients configured with the groupname, which may query the server database for server connection information such as uptime, downtime, and congestion in order to select a server for a preferential connection based on an overall availability profile as determined by the group client. The methods described herein eliminate a separate controller and thereby eliminate the single point of failure (SPOF) represented by connection controllers and load balancers in a network as are common in the current state of the art. Servers in the server group may periodically refresh their connection details to enable group client to server connections based on dynamic real-time updates, establishing a high-availability server group for the provision of services.

7 Claims, 1 Drawing Sheet

(56) References Cited

U.S. PATENT DOCUMENTS

| 2001/0039585 | A1* | 11/2001 | Primak | H04L 61/1511 |
| | | | | 709/228 |
| 2007/0260676 | A1* | 11/2007 | Bozinovski | H04L 67/1023 |
| | | | | 709/203 |
| 2008/0172451 | A1* | 7/2008 | Kim | H04L 67/06 |
| | | | | 709/203 |

* cited by examiner

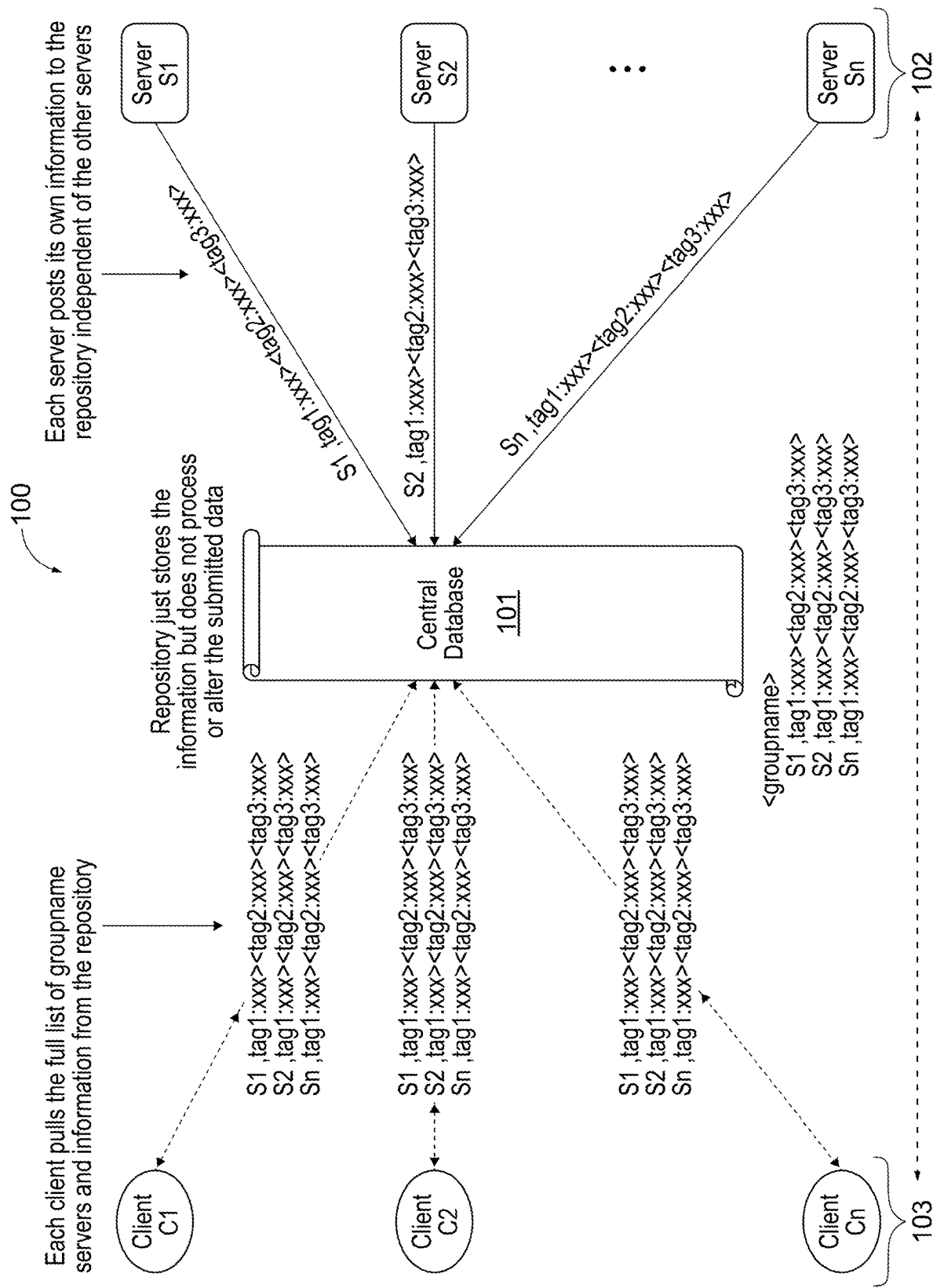

SYSTEMS AND METHODS FOR AUTOMATED, CONTROLLERLESS AND STATELESS NETWORK CONNECTION SELECTION BASED ON DISTRIBUTED SERVER INFORMATION

STATEMENT REGARDING FEDERALLY SPONSORED RESEARCH OR DEVELOPMENT

The invention described in the present application was conceived and reduced to practice without the benefit of federal funding.

BACKGROUND OF THE INVENTION

The invention is that of systems and methods for controllerless and distributed network connection reachability, including optimized load balancing and connection traffic engineering leading to high-availability (HA) connection applications on a network.

Current technologies and implementations are based on centrally and collocated services that aim to make a set of servers or services appear as one. Load balancers direct inbound connections to a plurality of backend servers, wherein a load balancer acts as a network traffic controller.

For HA redundancy, state of the art technology involves the assignment of one or more servers into a group, and then virtualizing which server and network interfaces are presented to the wider network. If a server in the group goes down, then another is reconfigured with the virtualization information and takes over. They are grouped together as a physical unit and will present a single service to the network as if from a single server. There is no ability to have various servers operating in different physical and logical locations.

Additionally, a remote application attempting to connect with a server in the group has no information about the server status (e.g., uptime, downtime, impaired, sunset, etc.) and how it might establish a connection to that application (e.g., User Datagram Protocol (UDP), Transmission Control Protocol (TCP) over cellular Port A, Port B, etc.). It would be desirable for a remote application to be equipped with this information so that can intelligently direct where it should connect, when and how.

For example, it may be desirable to perform maintenance on a server, but also desirable to not to disconnect all existing connections but rather wait until they naturally disconnect (e.g., sunset). In that case, it would be beneficial to alert clients that no new connections are available to the server targeted for maintenance, but if a client is connected, to stay connected. Similarly, it may be beneficial to indicate whether traffic to a particular server is congested, in which case a remote application may connect to another server with less congestion based on its needs.

In view of current methods, there is an explicit market need in the art for a method for a logical group of network applications (e.g., servers) to publish information about the reachability of those applications as well as details about how to associate or communicate with them, such as in a database visible to remote clients. Without using an intermediate controller or director, the methods described herein meet this need by distributing all of the available servers and the information contained on each asynchronously, so each individual remote application has full visibility of the list of servers within a group and can use that visible server information to establish connections in the most efficient manner possible.

BRIEF SUMMARY OF THE INVENTION

The invention of the present disclosure involves the configuring of each of a selected group of applications ("servers") with a group name and posting of a unique identifier (UID) for each server to a central database with the group name, along with various status and connection details. Remote applications ("clients") will be configured with the group name only instead of individual server addresses. A client will query the central database and obtain the active list of all the servers that have posted a UID as well as their status and connection details. Clients will analyze this list and individually make connections based on the client's desired configuration.

It is important to note that the central database does not perform any modification or adjudication of any server's postings (i.e., the system is controllerless). The database simply receives database entries and updates or provides information for any inquires for a group name. Additionally, all clients configured with a group name will have full visibility to the available resources within that group, and overall reliability is increased as there isn't a central controller as a single point of failure (SPOF) for connecting and obtaining services. Another benefit is that servers in a group do not have to be collocated or grouped together physically or configured as a closed cluster using older redundancy technologies. This and other benefits of the invention of the present disclosure will become evident to one of ordinary skill in the art in view of the disclosure that follows and accompanying drawings and claims.

BRIEF DESCRIPTION OF THE DRAWINGS

FIG. 1 is a high-level diagram showing the relationship between clients, servers and a database of server information for a given group named as described herein.

DETAILED DESCRIPTION OF THE INVENTION

The invention is that of systems and methods for controllerless and distributed network connection reachability, including optimized load balancing and connection traffic engineering leading to HA connection profiles on a network. A system according to the present disclosure allows for the configuration of remote clients with a group name for a corresponding group of servers and a database containing information on each server within the group, which a client may access in order to direct connection behavior and obtain services more readily based on data traffic congestion levels and other factors affecting connectivity.

In certain embodiments, the invention provides methods for a logical group of servers to publish information about their reachability as well as details about how to associate or communicate with them in a database corresponding to the group and available to remote clients. A method according to the present invention comprises distribution of all of the available servers and their information asynchronously, so an individual client has full visibility to a list of servers within a group and can direct data traffic to a server with the most suitable connection attributes.

The invention of the present disclosure enables clients to identify suitable connections without prior connection or communication with any server in a group, and without a controller, enables a group of resources to be located physically or logically anywhere in a network and pushes group resource information to all associated remote applications for local decision processing. This eliminates the presence of an SPOF for obtaining services and reduces the possibility of service interruption by housing servers at different physical locations.

A typical application according to a system of the present disclosure would be a collection of servers organized as an administrative unit, identified by a group name. One or more clients may need to connect to one or more of these servers. For load balancing, HA, traffic engineering, or maintenance operations, it is desirable to signal to the clients which server or servers are available and details on the status of each.

It is one object of the invention of the present disclosure to overcome the need for a separate controller to manage load balancing, availability, or traffic engineering. A separate controller is an added expense, another item that must be maintained, and is another possible point-of-failure in the network. It is an object of the present invention to remove the risk associated with a SPOF in favor of multiple distributed connection points.

It is another object of the invention to overcome the need for a headend group of resources to be physically grouped together. Solutions that are currently available require similar devices identified as a group to be collocated with each other. These implementations group a set of appliances together and present a monolithic service to the network. For example, Virtual Router Redundancy Protocols (VRRPs) as are presently known in the art are typically implemented by presenting a group of routers that are physically connected, such as via local Ethernet connections, as a monolithic processing unit, wherein traffic to the primary network device fails over to another associated network device when connectivity to the primary appliance fails.

It is another object of the present invention to overcome the monolithic server approach by distributing server status and connectivity information to endpoints that initiate connections. With the present invention, remote applications can choose selected resources according to the appropriate connection protocols and service availability, and the general status information of the servers housing those services.

A system according to the invention of the present disclosure may include applications that are in a server posture (i.e., waiting for an inbound connection); applications that are in a client posture (i.e., positioned to make an outbound connection to a server); and a database (repository) organized by a group name and populated with server UID information and one or more information fields that include details about each server in the group.

In certain embodiments, a server that should be put into a group will be configured with the appropriate group name according to a method of the present invention. The server will then asynchronously update the groupname, as contained in the database, with its UID (such as its media access control (MAC) address, for example) and various details about its status, connection profile, or any other information deemed necessary for remote applications to target the server as a connection. The server will only update its own information and for purposes of updating the database and client connections, is generally independent of other servers having its same group name. Each update will have a timestamp to indicate its freshness, and thus if a server fails and does not update its entry, it will be evident that this server is stale and not preferred as other servers will have newer timestamps. As a frame of reference, a server can be considered stale if it doesn't update with a defined period of time, e.g., 60 seconds.

When a remote application or client wishes to connect to a specified server, it will query the database and receive a list of servers and their associated details. It is important to note that this is done without direct communication to the servers or an intermediate controller. The client can then scan the entire list and make a connection to a server based on its requirements.

An illustrative embodiment of a system according to the present disclosure 100 is shown in FIG. 1. At the center of the system is a server database 101 containing a UID for each server within a server group 102 comprising Servers S1-Sn, as well as status and connection details, for example. As explained in the figure, each server posts its own information to the server database 101 independently of the other servers in the server group 102. Group clients 103 C1-Cn are each configured with the groupname of the server group 102 and can use the groupname to query the server database 101 to determine the availability of each server and information relevant to its status, freshness, etc. The server database 101 does not process or alter any information from servers in the server group 102, but the servers may update the posted information at desired intervals, enabling dynamic assessment by group clients 103 of servers in the server group 102 to further enable optimal connections and network utilization.

As discussed above, it is an object of the invention of the present disclosure to enable distributed HA reachability of network services by group clients C1-Cn without making use of a stand-alone controller as is common among state-of-the-art solutions that require configuration, maintenance, replacement, and the like that can lead to reduced availability of network resources and added costs. It is a further object of the invention of the present disclosure to eliminate the requirement of physical collocation of network applications such as servers that is attendant to current solutions, thereby leading to a more dynamic and asynchronous approach to making distributed services available to group clients 103 of a server group 102 as illustrated in FIG. 1.

These and other embodiments of the systems and methods described and illustrated herein will be understood by one of ordinary skill in the art, the illustrations contained herein representing illustrative embodiments of the invention and not limitations on implementations of the systems and methods as described herein.

Explained another way, the invention of the present disclosure comprises a system for controllerless and distributed network connection reachability, the system comprising a server group, each server in the server group having a unique identifier (UID) and a server software module tangibly stored on a nontransitory computer readable medium comprising instructions which when executed by a processor cause the processor to post the UID and server connection information to a server database; a server database comprising a UID and server connection information for each server of the server group; and one or more group clients, each group client configured with the groupname for the server group and a client software module comprising instructions which when executed by a processor cause the processor to acquire the server connection information. The server connection information may be selected, for example, from the group consisting of status information, uptime, downtime, impaired, congestion and sunset. In certain embodiments, the group client establishes a preferential connection with a server in the server group based on the server connection information.

A UID according to the present disclosure may be selected from the group consisting of a media access control (MAC) address, an X.509 certificate, a common name, an extension, a hash code, an action request, a source Internet Protocol (IP) address, a source port identifier, a source protocol and combinations thereof.

A system according to the present disclosure may enable a method for establishing a controllerless connection to a server in a server group comprising the steps of configuring one or more clients with the groupname for the server group and causing a connected microprocessor to acquire the connection information of selected servers within the server group for connection selection by the one or more clients from a server database by executing instructions of a client software module of a client configured with the groupname, wherein each server in the server group is configured with a UID, such as but not limited to a UID selected from the group consisting of a MAC address, an X.509 certificate, a common name, an extension, a hash code, an action request, a source IP address, a source port identifier, and a source protocol. In certain embodiments, the connection information is selected from the group consisting of status information, uptime, downtime, impaired, congestion and sunset.

In certain embodiments, a method according to the present disclosure may further comprise a step of causing a connected microprocessor to establish a connection with the server by executing instructions of the client software module.

These and other embodiments are presented as examples and not limitation of the capabilities enabled by the present invention. One of ordinary skill in the art will appreciate the need in the art for improvements in network reachability that are not reliant on controllers, such reliance being well understood in the current state of the art.

What is claimed:

1. A system for automated, controllerless and stateless network connection selection, the system comprising:
    a central database in direct network communication with a plurality of servers in a server group and a plurality of clients in a client group, wherein each server of the plurality of servers comprises a unique identifier;
    a server software module tangibly stored on a nontransitory computer readable medium comprising instructions which when executed by a first processor cause the first processor to transmit the unique identifier and server connection information of each server of the plurality of servers to the central database without any modification or adjudication;
    wherein each client of the plurality of clients in the client group is configured with a group name for the server group; and
    a client software module comprising instructions which when executed by a second processor cause the second processor to acquire the server connection information;
    wherein the server connection information enables each client of the plurality of clients to establish a preferential direct connection with a server in the server group;
    wherein the central database does not reside on any server of the plurality of servers, and does not perform any modification or adjudication of the server connection information; and
    wherein the server connection information is not modified or adjudicated by any intermediate device in a communication path between any client of the plurality of clients or any server of the plurality of servers and the central database.

2. The system of claim 1, wherein the unique identifier is selected from a group consisting of a media access control (MAC) address, an X.509 certificate, a common name, an extension, a hash code, an action request, a source Internet Protocol (IP) address, a source port identifier, a source protocol and combinations thereof.

3. The system of claim 1, wherein the server connection information is selected from a group consisting of status information, uptime, downtime, impaired, congestion and sunset.

4. A method for establishing a controllerless connection to a server of a plurality of servers in a server group, the method comprising:
    configuring a plurality of clients of a client group with a group name for the server group; and
    causing a connected processor to execute instructions of a client software module of a client configured with the group name, which when executed by the connected processor cause the connected processor to acquire unmodified and unadjudicated server connection information of one or more selected servers of the plurality of servers for preferential direct connection selection by the client from a central database;
    wherein each server of the plurality of servers is configured with a unique identifier;
    the central database does not reside on any server of the plurality of servers and does not perform any modification or adjudication of the server connection information; and
    wherein the server connection information is not modified or adjudicated by any intermediate device in a communication path between any client of the plurality of clients or any server of the plurality of servers and the central database.

5. The method of claim 4, wherein the unique identifier is selected from a group consisting of a media access control (MAC) address, an X.509 certificate, a common name, an extension, a hash code, an action request, a source Internet Protocol (IP) address, a source port identifier, and a source protocol.

6. The method of claim 4, wherein the server connection information is selected from a group consisting of status information, uptime, downtime, impaired, congestion and sunset.

7. The method of claim 4, further comprising the step of causing the connected processor to establish a connection with the server of the plurality of servers of the server group by executing instructions of the client software module.

* * * * *